United States Patent
Blessum et al.

(10) Patent No.: US 10,060,807 B2
(45) Date of Patent: *Aug. 28, 2018

(54) METHOD AND SYSTEM FOR MONITORING BEND AND TORQUE FORCES ON A DRILL PIPE

(71) Applicant: The Charles Machine Works, Inc., Perry, OK (US)

(72) Inventors: Dustin L. Blessum, Perry, OK (US); Michael F. Gard, Perry, OK (US); Kendall C. Young, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/215,241

(22) Filed: Jul. 20, 2016

(65) Prior Publication Data
US 2017/0023421 A1    Jan. 26, 2017

Related U.S. Application Data

(63) Continuation-in-part of application No. 14/486,439, filed on Sep. 15, 2014, now abandoned, which is a continuation of application No. 13/165,418, filed on Jun. 21, 2011, now Pat. No. 8,833,183.

(60) Provisional application No. 62/194,454, filed on Jul. 20, 2015, provisional application No. 61/356,863, filed on Jun. 21, 2010.

(51) Int. Cl.
| | |
|---|---|
| *G01L 1/24* | (2006.01) |
| *E21B 47/00* | (2012.01) |
| *E21B 44/02* | (2006.01) |
| *E21B 7/04* | (2006.01) |
| *E21B 7/02* | (2006.01) |
| *G01B 11/16* | (2006.01) |
| *G01B 11/255* | (2006.01) |
| *G01L 3/12* | (2006.01) |

(52) U.S. Cl.
CPC ............... *G01L 1/24* (2013.01); *E21B 7/022* (2013.01); *E21B 7/046* (2013.01); *E21B 44/02* (2013.01); *E21B 47/0006* (2013.01); *G01B 11/16* (2013.01); *G01B 11/255* (2013.01); *G01L 3/12* (2013.01)

(58) Field of Classification Search
CPC .................................. G01B 11/16; G01L 1/24
See application file for complete search history.

(56) References Cited

U.S. PATENT DOCUMENTS

| | | |
|---|---|---|
| 3,791,043 A | 2/1974 | Russell |
| 4,291,978 A | 9/1981 | Seigel |
| 6,176,323 B1 | 1/2001 | Weirich et al. |

(Continued)

*Primary Examiner* — Freddie Kirkland, III
(74) *Attorney, Agent, or Firm* — Tomlinson McKinstry, P.C.

(57) ABSTRACT

A system and method for monitoring bend radius and torque force exerted on a drill string. A sensor system is supported within a pipe section of the drill string and has a light source supported within the pipe section to emit a light beam within the pipe section. An optical sensing device is supported within the pipe section and spaced apart from the light source. The optical sensing device transmits a detection signal indicative of the position of the light beam on a surface of the optical sensing device to a processor that determines the bend radius and torque force exerted on the pipe section.

20 Claims, 12 Drawing Sheets

(56) References Cited

U.S. PATENT DOCUMENTS

| | | | |
|---|---|---|---|
| 7,503,403 B2 | 3/2009 | Jogi et al. | |
| 7,528,946 B2 | 5/2009 | Gunsaulis | |
| 7,557,339 B2 | 7/2009 | Poland et al. | |
| 7,584,808 B2 | 9/2009 | Dolgin et al. | |
| 7,591,188 B2 | 9/2009 | Allen et al. | |
| 8,106,853 B2 | 4/2012 | Mitchell | |
| 8,160,853 B2 * | 4/2012 | Mitchell | E21B 47/022 703/10 |
| 8,587,780 B2 * | 11/2013 | Gallet | G01L 3/12 250/225 |
| 8,594,987 B2 | 11/2013 | Mitchell | |
| 8,833,183 B2 * | 9/2014 | Blessum | G01L 1/24 73/862.624 |
| 2006/0157278 A1 * | 7/2006 | Dolgin | E21B 17/1057 175/45 |
| 2006/0157578 A1 | 7/2006 | Dolgin et al. | |
| 2007/0188742 A1 | 8/2007 | Gunsaulis | |
| 2011/0308332 A1 * | 12/2011 | Blessum | G01B 11/16 73/862.624 |
| 2015/0000424 A1 * | 1/2015 | Blessum | G01B 11/16 73/862.624 |

* cited by examiner

METHOD AND SYSTEM FOR MONITORING BEND AND TORQUE FORCES ON A DRILL PIPE

CROSS-REFERENCE TO RELATED APPLICATIONS

This application claims the benefit of U.S. Provisional Patent Application Ser. No. 62/194,454 filed on Jul. 20, 2015, and is also a Continuation-in-Part of U.S. patent application Ser. No. 14/486,439 filed Sep. 15, 2014, which is a continuation of U.S. patent application Ser. No. 13/165,418 filed Jun. 21, 2011, now U.S. Pat. No. 8,833,183 issued Sep. 16, 2014, which claims the benefit of U.S. Provisional Patent Application Ser. No. 61/356,863 filed Jun. 21, 2010, the contents of which are incorporated herein by reference.

FIELD

The present invention relates generally to installation of underground utilities and specifically to a system for monitoring of forces exerted on drill pipe during operation of a drill rig.

SUMMARY

The present invention is directed to a system for monitoring a force exerted on a pipe section. The system comprises a light source supported within the pipe section to emit a light beam within the pipe section, an optical sensing device supported within the pipe section and spaced apart from the light source, and a processor. The optical sensing device transmits a detection signal indicative of the position of the light beam to a surface of the optical sensing device. The processor receives the detection signal and processes the detection signal to determine the force exerted on the pipe section.

The present invention further includes a directional drilling system comprising a drive machine, a drill string comprising a first end and a second end, wherein the first end is operatively connected to the drive machine, a downhole tool assembly connected to the second end of the drill string for movement therewith, a sensor assembly, and a processor. The sensor system is disposed along the drill string to measure bend radius and torque force exerted on the drill string. The sensor system comprises a light source supported within the pipe section to emit a light beam within the pipe section and an optical sensing device supported within the pipe section and spaced apart from the light source, wherein the optical sensing device transmits a detection signal indicative of the position of the light beam on a surface of the optical sensing device. The processor receives the detection signal and processes the detection signal to determine the forces exerted on the pipe section.

The invention is also directed to a method for determining bend radius and torque forces exerted on a pipe section during drilling operations. The method comprises transmitting a light beam from a light source disposed within the pipe section and detecting the tight beam with an optical sensing device supported within the pipe section. A detection signal indicative of the position of the light beam on the optical sensing device is generated and transmitted to a processor. The detection signal is processed to determine the torque force or bend radius of the pipe section.

DETAILED DESCRIPTION

Horizontal directional drilling (HDD) permits installation of utility services or other products underground in an essentially "trenchiess" manner, eliminating surface disruption along the length of the project and reducing the likelihood of damaging previously buried products. The typical HDD bore path begins from the ground surface as an inclined segment that is gradually leveled off as the desired product installation depth is neared.

HDD has proven to be a useful method for the installation of numerous types of underground utilities—such as telephone and electric lines and gas, water, and gravity flow conduits. The ever increasing population of in situ utilities has created a need for accurate and dependable steering systems to steer around existing utilities. These steering systems, however, are often limited by the bend radius and torque limitations of the drill pipe used in the drilling operations. Thus, HDD systems sometimes are damaged as a result of exceeding bend radius and/or torque limitations. Accordingly, a need to monitor the bend radius and torque forces exerted on the drill string during boring operations has arisen. The present invention teaches a system and method for monitoring such forces.

Figure 1:
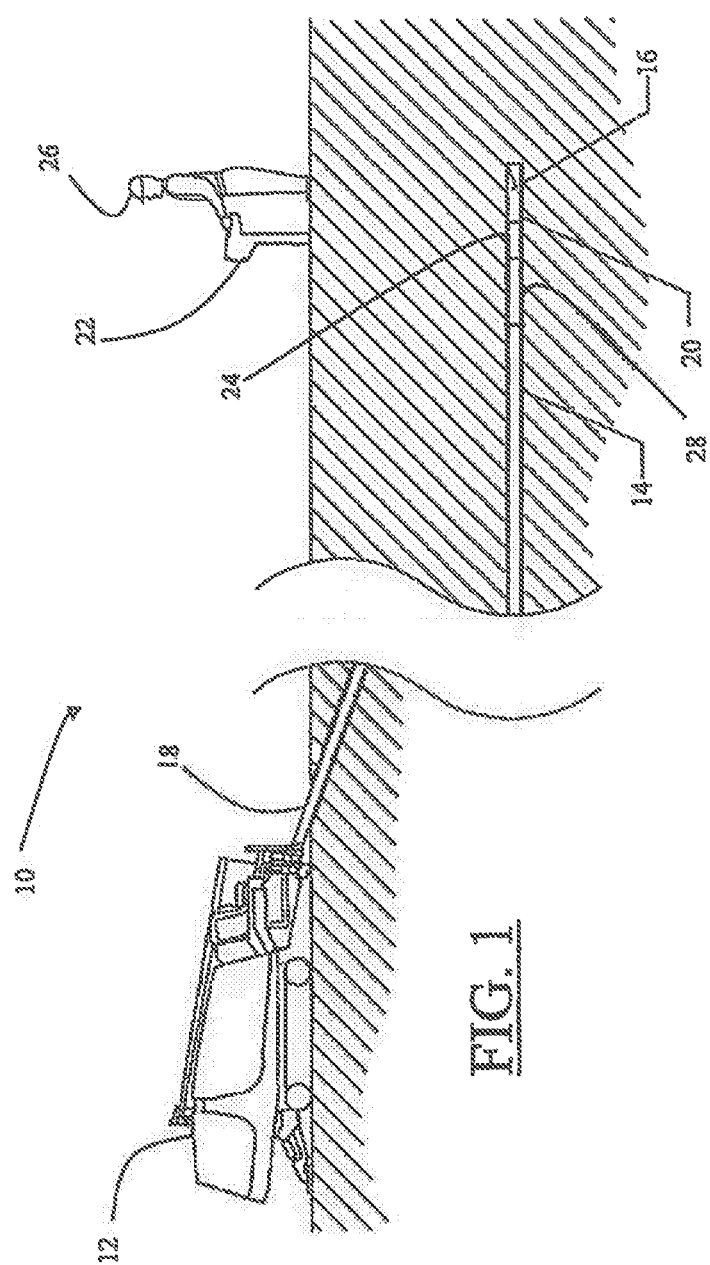
FIG. 1 is a diagrammatic representation of a horizontal directional drilling system showing the use of a drive machine, drill string, and drill bit supported at the downhole end of the drill string.

With reference to FIG. 1, there is shown therein a drilling system 10 constructed in accordance with the present invention. The drilling system 10 shown in FIG. 1 is an HDD system. However, one skilled in the art will appreciate that the sensor assembly of the present invention may be used in other forms of drilling such as vertical drilling. The HDD system 10 comprises a drive machine 12, a drill string 14, and a downhole tool assembly 16. The drill string 14 comprises a first end 18 and a second end 20. The first end 18 of the drill string 14 is operatively connected to the drive machine 12. The downhole tool assembly 16 is connected to the second end 20 of the drill string 14 for movement therewith.

A tracking receiver system 22 may be used to determine the position and orientation of the downhole tool assembly 16 using "walkover" techniques. For walkover tracking, a beacon 24 is disposed within the downhole toot 16 and adapted to transmit a magnetic field (not shown).

The drive machine 12 advances the drill string 14 and the downhole tool 16 through the ground. As referenced herein, a downhole toot 16 may be a boring toot for use during a boring operation or a backreamer for use in a backreaming operation. Though discussed primarily with regard to the boring operation, the apparatus and methods discussed herein are equally applicable to a backreaming operation. An operator 26 on the surface of the ground—utilizing the tracking receiver system 22—follows the beacon 24 and periodically determines the depth and direction of the downhole tool 16 utilizing techniques known in the art.

The drill string 14 may comprise a plurality of pipe sections connected end-to-end to form the elongate drill string shown in FIG. 1. The drive machine 12 is capable of adding pipe sections to the first end 18 of the drill string as the downhole tool assembly 16 and drill string are advanced through the ground. The drive machine 12 may also be capable of removing pipe sections from the drill string 14 as the drill string is pulled towards the drive machine. White the present invention is described herein with reference to a single pipe drill string and a boring tool having a single beacon 24, it will be appreciated that a dual-pipe drill system and tooling as disclosed in U.S. Pat. No. 6,827,158 may be utilized with the invention. Additionally, an alternative version of the two pipe system as disclosed in U.S. Pat. No. 7,111,693 having a trailing second beacon may be used in accordance with the present invention.

Basic walkover style position and orientation sensing systems are described in U.S. Pat. No. 5,264,795 issued to Rider, U.S. Pat. No. 5,850,624 issued to Gard, et al., and U.S. Pat. No. 5,880,680 issued to Wisehart, et al., the contents of which are incorporated herein by reference. Sensors for determining the orientation of the downhole tool 16 are described in the latter two patents as well as in U.S. Pat. Nos. 5,133,417 and 5,174,033 issued to Rider and U.S. Pat. No. 5,703,484 issued to Bieberdorf, et al., the contents of which are also incorporated herein by reference.

Continuing with FIG. 1, there is shown a sensor system 28 disposed at a point along the drill string 14 to measure bend radius and torque force exerted on the drill string. Such a sensor assembly 28 may measure the torque force and bend radius on the drill string 14 during drilling operations in a manner described hereinafter. The data collected by the sensor system 28 may be transmitted to either the drive machine 12 or the tracking receiver system 22 for display to the drive machine operator (not shown) or the operator 26. Data may be transmitted from the sensor assembly 28 to the tracking receiver system 22 using the magnetic field transmitted by the beacon 24 and subsequently from the tracking receiver system to the drive machine 12 using a radio frequency communication system. Alternatively, data from the sensor system 28 may be transmitted directly to the drive machine 12 by either drill string telemetry or wire line telemetry systems.

Figure 2:
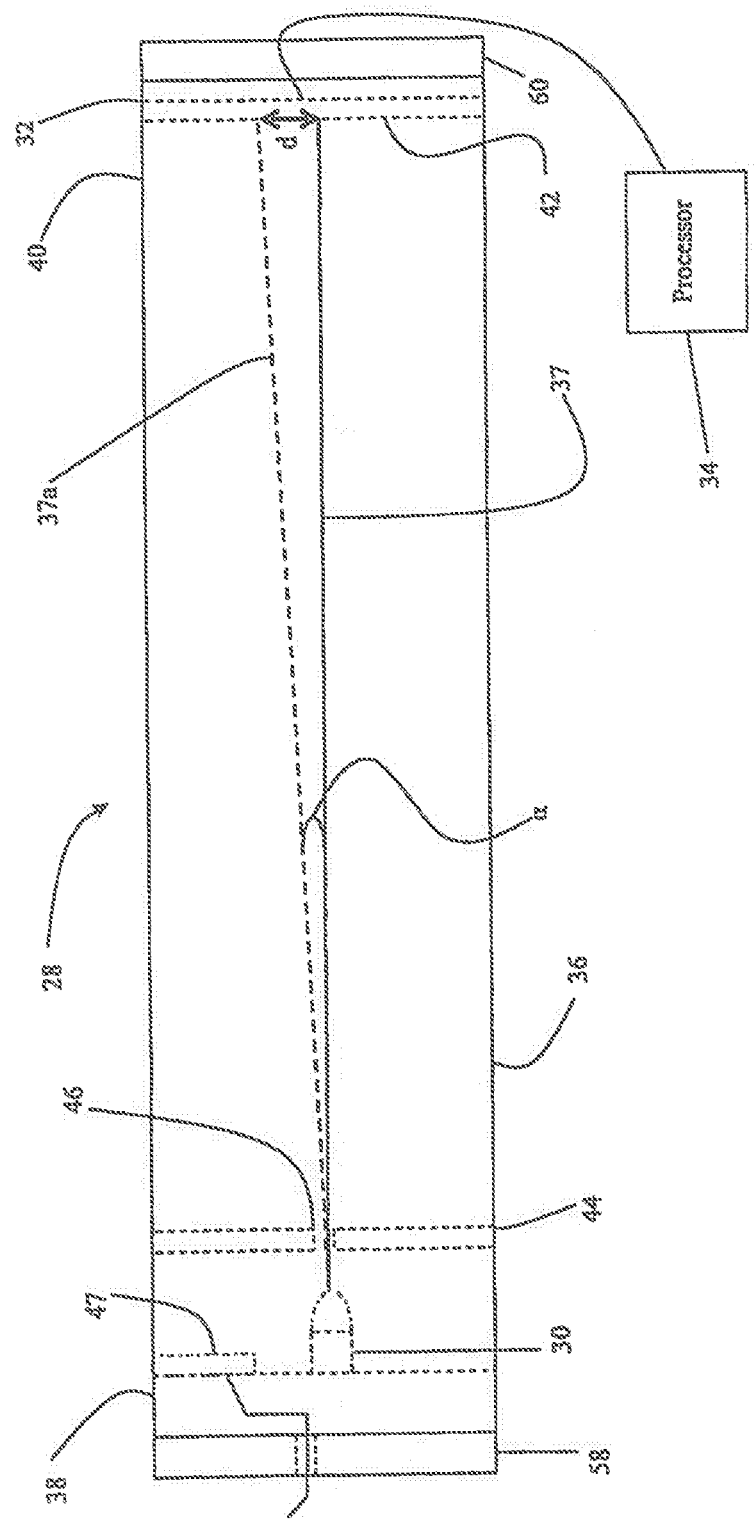
FIG. 2 illustrates a preferred embodiment of the sensor system of the present invention.

Turning now to FIG. 2, the sensor system 28 of the present invention is shown therein. The sensor system 28 comprises a light source 30, an optical sensing device 32, and a processor 34. An elongate cylindrical housing 36 having a first end 38 and a second end 40 may support the components of the system within the pipe section of the drill string 14 (FIG. 1). An acceptable housing 36 of the present invention may have a length of fifteen (15) inches and an inner diameter of 1.5 inches. One skilled in the art will appreciate that such dimensions are dependent upon the chosen use of the sensor system of the present invention and may be altered as appropriate. The light source 30 is supported within the pipe section within the housing 36 to emit a light beam 37 within the pipe section. The optical sensing device 32 is supported at the second end 40 of the housing 36 so that it is spaced apart from the light source 30. The optical sensing device 32 detects the light beam 37 and transmits a detection signal indicative of the position of the light beam on an imaging surface 42 of the optical sensing device. The processor 34 receives the detection signal and processes the signal to determine the forces exerted on the sensor assembly and thus the pipe section in a manner yet to be described.

The tight source 30 may comprise a light emitting diode (LED) driven by a circuit board 47. Power may be provided the LED by a power supply cable passing through a first end cap 58. A second end cap 60 closes the second end 40 of the housing 36. The LED emits an light beam from the first end 38 of the housing 36 to the second end 40. One skilled in the art will appreciate that other light emitting devices such as an electroluminescent panel, a liquid crystal panel, a vacuum florescent device, or an incandescent light source may be used in accordance with the present invention.

An optical mask 44 may be used to collimate the light from the LED 30. Thus, the mask 44 may be made from a generally opaque material and have an orifice such as a pin hole 46 formed to allow a portion of the light from the LED to pass along the housing 36 to the surface 42 of optical sensing device 32. The sensor system 28 may also comprise lens (not shown) to produce a magnified deviation of the light from the LED on the optical sensing device 32. The optical sensing device 32 of FIG. 2 may comprise a commercial two dimensional camera photoarray detector.

Figure 3A:
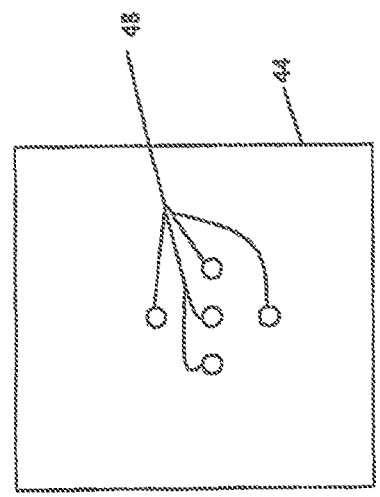
FIGS. 3a, 4a, 5a, and 6 are alternative optical mask configurations for use with the sensor assembly shown in FIG. 2.
Figure 3B:
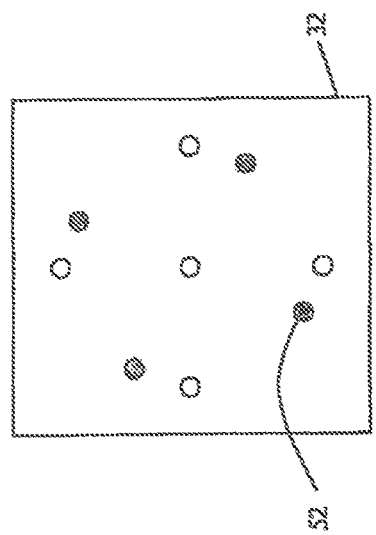
FIGS. 3b, 4b, and 5b show alternative embodiments of the surface of the optical sensing device used in the sensor assembly of FIG. 2 showing the position of the light beam after it has passed through the optical masks shown in FIGS. 3a, 4a, and 5a respectively.

FIGS. 3a, 4a, 5a, and 6 show alternative configurations of possible geometries of the optical mask 44 of FIG. 2. FIG. 3a illustrates an optical mask having an arrangement of pinholes 48 designed to cast the pinhole pattern shown in FIG. 3b and represented by circles 52. FIG. 3b shows a representative pattern cast on the optical sensing device 32 when the sensor system 28, and thus the pipe section, are under bending and/or torqueing loads. While the mask 44 has been described with reference to the existence of slots or orifices cut into the mask such orifices, holes, or slots are not required. Rather, the optical mask 44 may comprise a flat substrate having an opaque layer deposited thereon. Precision cuts or etchings may then be made in the opaque layer to allow tight to pass through locations wherein the opaque material has been removed. Furthermore, the specific geometry and number of tight passages formed in the optical mask 44 may take several different forms without departing from the spirit of the invention. The number and geometry shown in FIGS. 3a-6 are merely for illustrative purposes.

Figure 4A:
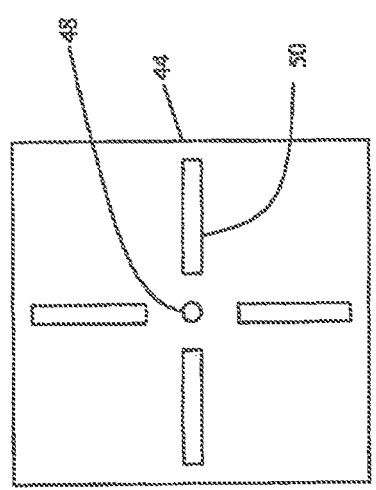
Figure 4B:
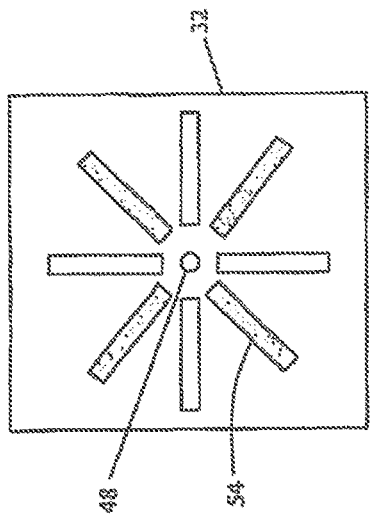
Figure 5A:
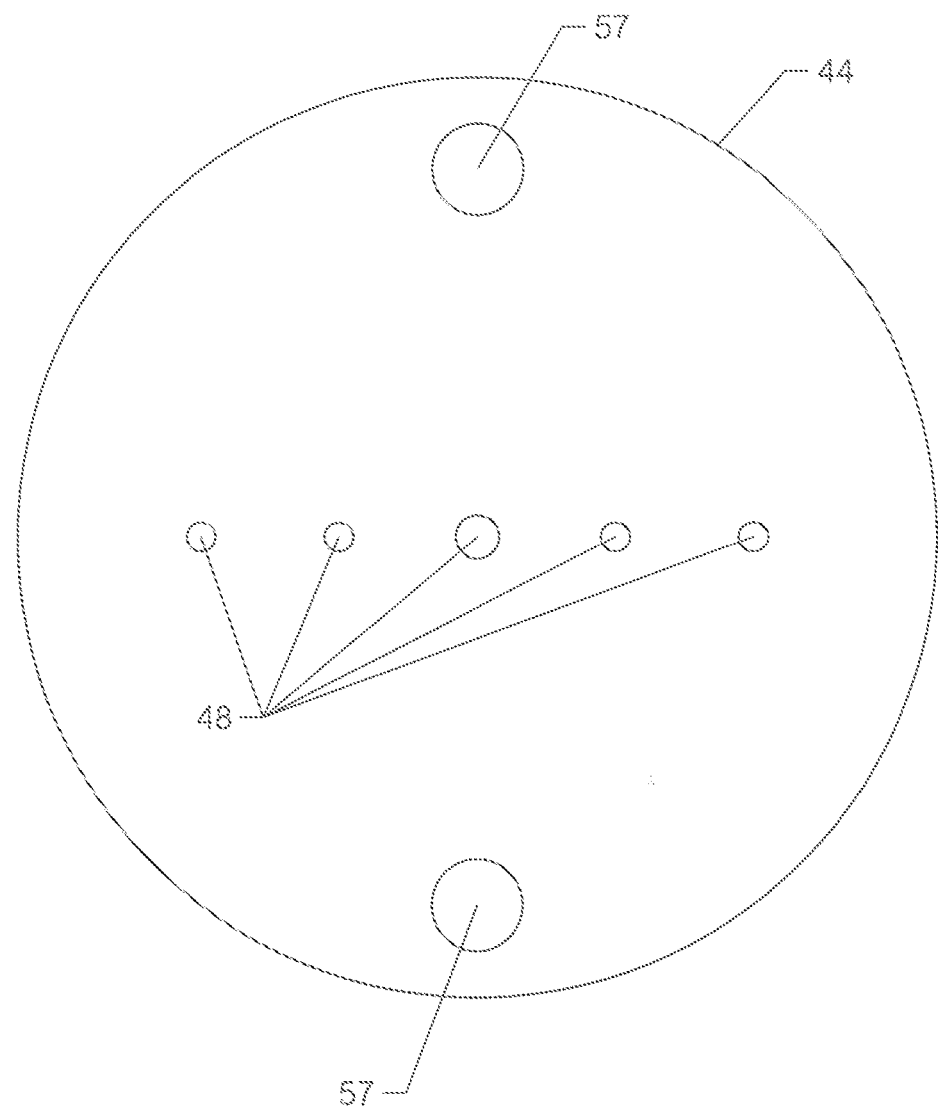
Figure 5B:
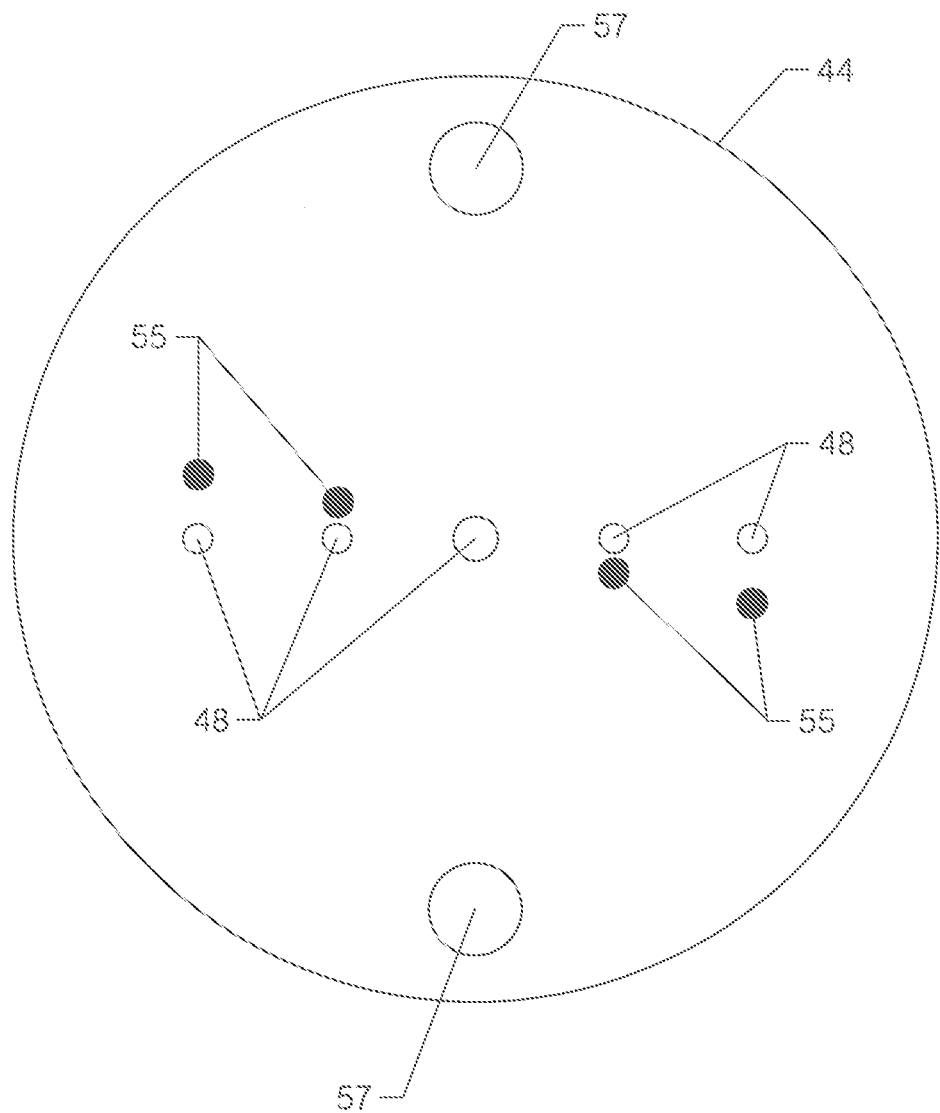
Figure 6:
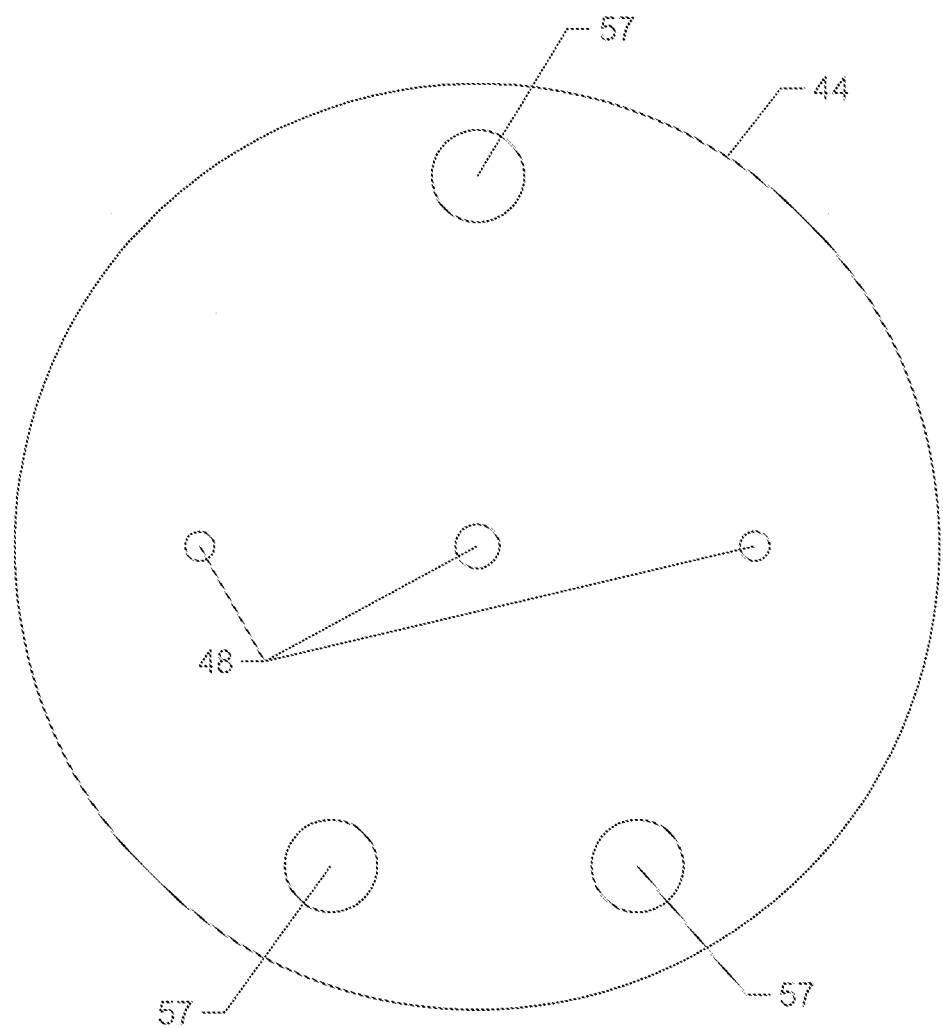

The pattern obtained after application of a torqueing force, or rotational load, is represented by the circles 52 in FIG. 3b. FIG. 4a shows an alternative optical mask 44 pattern having a pinhole 48 formed at the center of the optical mask 44 and a series of slots 50 formed about the pinhole. FIG. 4b shows a representative pattern cast on the optical sensing device 32 relative to the center hole 48 and slots 50 of mask 44 when the sensor system, and thus the pipe section, moves in response to applied bending and/or torqueing forces. The pattern obtained in response to a torqueing force is represented by the shaded slots 54. FIG. 5a shows another optical mask 44 pattern having a series of five (5) equally spaced collinear pinholes 48 formed along the horizontal diameter of a circular optical mask 44. Alternatively, FIG. 5a may only comprise three (3) collinear pinholes 48 as shown in FIG. 6. The center pinhole 48 may also have a larger diameter than the outer pinholes 48 as shown in FIG. 5a. FIG. 5b shows a representative pattern cast on the optical sensing device 32 when the sensor system, and thus the pipe section, moves in response to applied bending and/or torqueing forces. The pattern obtained in response to a torqueing force is represented by the shaded circles 55. A similar pattern would be cast on the optical sensing device 32 in response to a torqueing force if the optical mask 44 shown in FIG. 6 were used.

The optical mask 44 may further comprise a plurality of mating holes 57 around the outer circumference of the optical mask, as shown in FIGS. 5a, 5b and 6. The mating holes 57 mate with pins (not shown) inside of the housing 36 to orient the optical mask 44 within the housing. However, the mating holes 57 will not contribute to the pattern cast on the optical sensing device 32 in operation.

Returning to FIG. 2, the light beam 37 is emitted from the light source 30, passes through the optical mask 44, and is cast upon the optical sensing device 32. The tight beam 37 is representative of the sensor assembly in alignment so that the light beam 37 falls on the center of the surface 42 of the optical sensing device 32. When a force is applied to the housing 36 via the pipe section the resulting deflection is shown by light beam 37a and results in displacement, d, of the light spot on the surface 42 of the optical sensing device 32. If the separation distance between the pinhole or orifice 46 and the surface 42 of the optical sensing device is L then the deflection angle, α, is given by:

$$\alpha = \sin^{-1}(d/L) \qquad \text{[Equation 1]}$$

It is well known that, for small angles in radian measure, $\arcsin(\beta) \approx \beta$. Using this approximation, it may be shown the bend radius, R, is related to the deflection angle by:

$$R = L/2 \sin^{-1}(\alpha) \approx L^2/2d \qquad \text{[Equation 2]}$$

where the deflection angle, α, is measured in radians. Distances L and d are usually given in inches, which results in R being in inches. Accordingly, this value may require conversion to feet.

In the event the pipe section is subject to a combination of torque forces and bending forces, the light beam cast upon the surface 42 of optical sensing device 32 will move across the surface by a displacement "d" in response to the bending force, as shown in FIG. 3b. Torque forces applied to the pipe section will produce relative rotation of the sensor system 28. This relative rotation may be detected using the pinhole configuration shown in FIGS. 3a, 5a, and 6 or the slot configuration shown in FIG. 4a. The relationship between torque applied to a uniform cylindrical object and the resultant rotation is given by the relationship:

$$\Theta = 583.6 T/G(D_o^4 - D_i^4) \qquad \text{[Equation 3]}$$

where rotation angle θ is expressed in degrees, torque, T, is given in inch-pounds, l is the length of the pipe section in inches, $D_o$ and $D_i$ are the outer and inner diameters of the section in inches, and G is the shear modulus of rigidity in pounds per square inch (psi). The value for G for typical drill pipe steel is 11,500,000 psi. The applied torque may be calculated by the processor 34 using the relationship:

$$T = \Theta G(D_o^4 - D_i^4)/583.6l \qquad \text{[Equation 4]}$$

Figure 7:
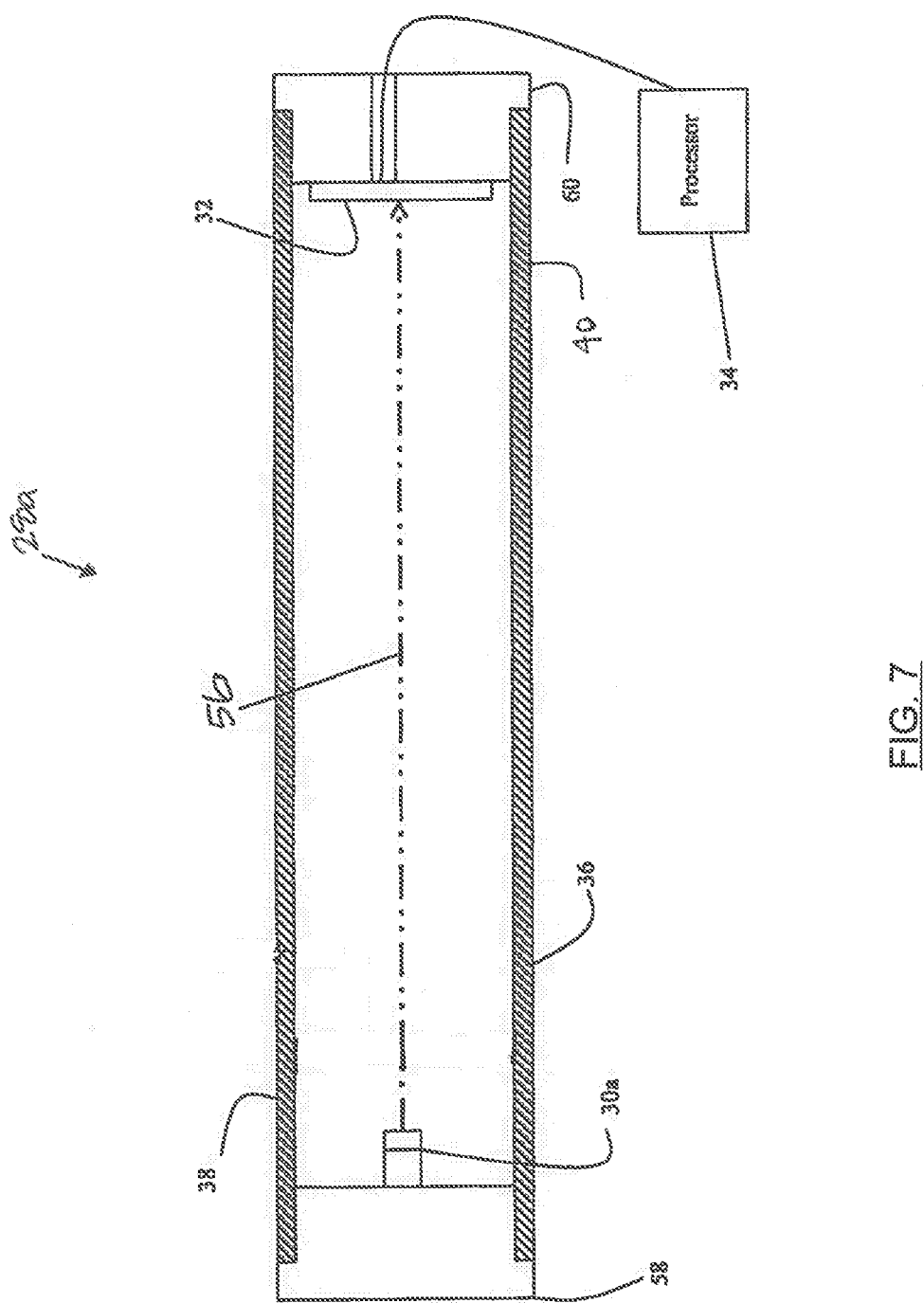
FIG. 7 is a diagrammatic representation of an alternative embodiment of the sensor system in which a laser emitting device comprises the light source.

Turning now to FIG. 7, in an alternative embodiment of the sensor system 28a is shown. The sensor system 28a comprises a light source 30a comprising a laser capable of emitting a laser beam 56. In contrast to the LED of FIG. 3, a laser 30a produces a coherent and collimated light without the need for the optical mask 44 or a lens. The laser 30a is supported within the housing 36 by a first end cap 58. The optical sensing device 32, may comprise a semiconductor photoarray such as a complementary metal-oxide semiconductor (CMOS) photoarray, and may be supported at the second end 40 of the housing 36 by a second end cap 60. An acceptable CMOS photoarray device for use in the present invention is an AA9653, a small development board available from www.Electronics123.com, which features an OmniVision (Santa Clara, Calif.) OV9653 1.3 Mega Pixel CMOS imager. One skilled in the art will appreciate that the optical sensing device 32 may also comprise a plurality of one-dimensional linear photosensitive arrays. Linear arrays may be particularly useful in a sensor system 28a for detection of the X-Y coordinate location of a crosshair pattern intersection at the outer boundary of the image arrays.

End caps 58 and 60 may be threaded into the end of housing 36 or snap into place to secure the laser 30 and photoarray 32 in relative alignment. A processor 34 (FIG. 2) receives the detection signal from the photoarray and processes the signal to determine the bend and/or torque forces exerted on the pipe section.

Figure 8:
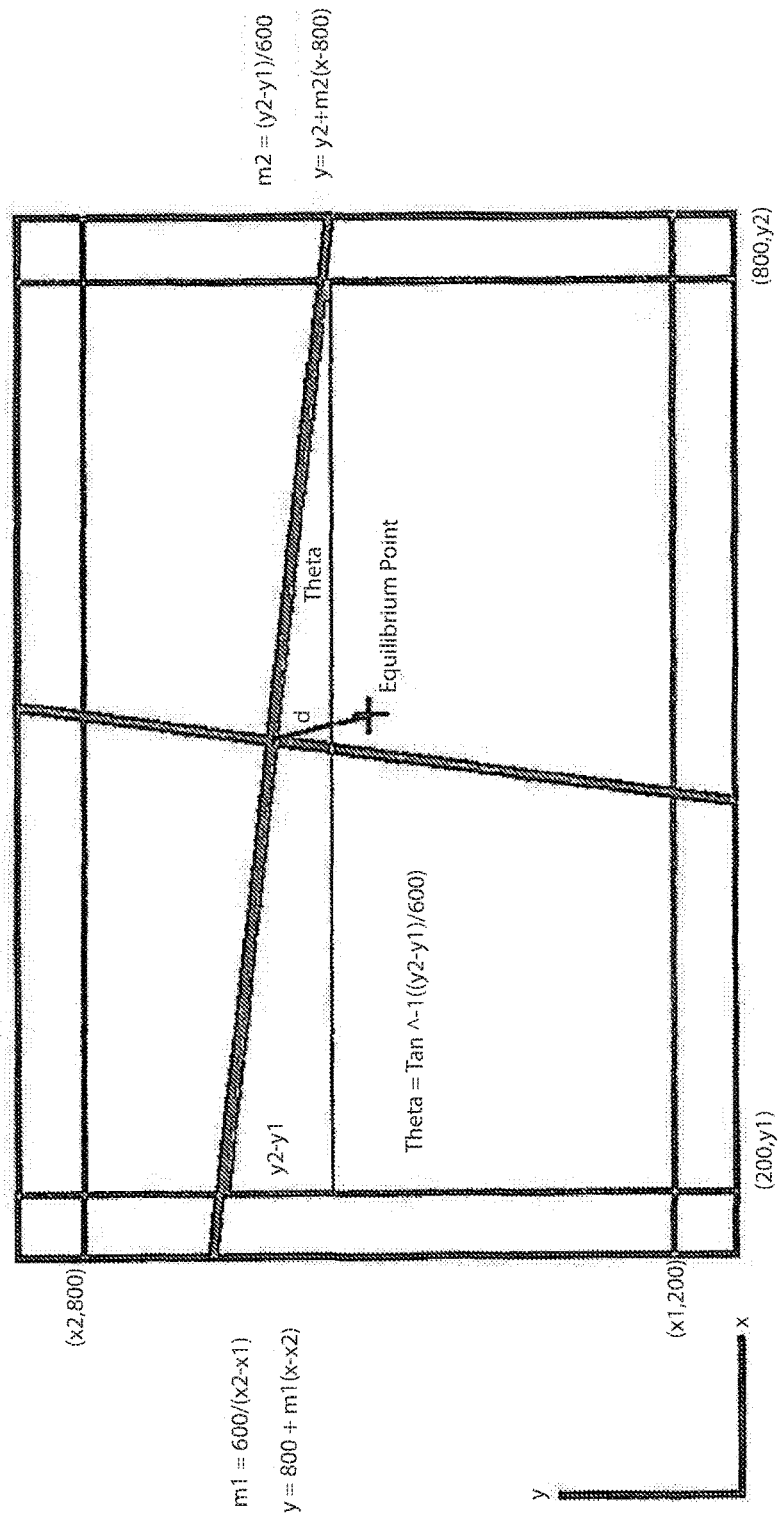
FIG. 8 shows the cross-hair pattern of the laser-based device of FIG. 7.

Several techniques may be used to determine the bend radius and torque force exerted on the drill string. A preferred process is a windowing technique which uses beam edge detection with pixel locations and geometry to determine the slope of the perpendicular beams that make up a cross hair laser beam. The cross hair beam may be used to calculate the angle of deflection and the center of the two perpendicular beams. Comparing these values with the same measurements taken at the start of the boring operation, when the drill string was not experiencing any external force, will provide the bend radius and torque. FIG. 8 illustrates the windowing technique.

An alternative process for determining bend and torque may include saving image frame data from the photoarray 32 and using image-processing techniques to determine the bend radius and torque.

The photoarray 32 is operatively connected to the processor 34 to send the detection signal to the processor. One skilled in the art will appreciate that the detection signal of the present embodiment may comprise all or a windowed portion of the photoarray surface. The processor may comprise a 16-bit 25 MHz micro-controller unit (MCU) utilizing serial peripheral interface bus communication for controls and initialization. The MCU 34 will instruct the photoarray 32 to send specified regions, or windows, of the total imaging area. The photoarray 32 will transfer its windowed image data over an 8-bit bus to the MCU. The MCU will then store this data to memory on chip and then determine torque and bend of the pipe section.

The MCU 34 may be programmed to initialize the photoarray 32 and use the process described below to find the angle of deflection and center of the illuminated optical pattern when it is at equilibrium, or otherwise not experiencing any external forces.

The process of finding the angle of deflection and center point may begin by the MCU 34 gathering a complete or a windowed data set from a range of columns or rows in the pixel array of the photoarray 32. The collected data is then tested against a set of threshold values. If a given pixel value is greater than a predetermined threshold value, that pixel is considered to be illuminated by the source pattern. Assume the source pattern is an illuminated crosshair pattern. The first time the threshold is exceeded in a row or column scan, it is determined that an edge of a crosshair beam has been detected. The pixel location where the edge was detected is then stored. The MCU will keep reading values for that set of columns or rows until the other edge of the crosshair beam is detected. This occurs when the threshold value is no longer exceeded. A given row or a given column may contain illuminated image cells (picture elements, or pixels) from more than one crosshair. Assuming the source pattern is known to be a set of crosshairs, it is known a priori that the image pattern must consist of two linear features whose slopes are negative inverses. This information may be used to mathematically define the crosshair lines, to define the pixel (or pixels) located at their intersection, and to extract other information related to the position of the crosshairs and the torque responsible for their orientation.

Pixel dimensions, determined by individual cell dimensions on the photoarray 32, are very small and the width of apertures, slits, orifices, or other features used to form the source array are relatively large in relationship to the dimensions of a single pixel. Thus, the result of a row or column scan across the image (or across a windowed image) is likely to return more than one pixel location. The physical origin of a multi-pixel line width is well understood, but the mathematical solutions for line equations, line intersections, and rotation angle determinations make it necessary to model observed image data as if the linear features are very small compared to pixel dimensions. For this reason, the center of each crosshair beam is considered to be the average of the two edge pixels as determined in the preceding paragraph. This determination may be made using only the illuminated pixels at the extreme edges of the image window, or it can be determined on a line-by-line or column-by-column basis as a matter of design choice at the option of the software developer.

Actual forces acting on the sensor may be considered as the superposition of two different types of force: a bending force assumed to be normal to the sensor tube wall producing a simple translation of the crosshairs, and a force couple (torqueing or torsional force) which produces rotation of the crosshairs about a central point called the center of rotation. Incremental changes in bending and rotation may be determined from two photoarray data sets taken at different times.

Determination of bend radius and rotation may be done independently, although it may be possible to find a solution in a computational single step. As an example, consider two photoarray images acquired at different times. Let the earlier time be denoted time1 and let the later time be denoted time2. Those skilled in the software arts will appreciate that a number of algorithms can be found to extract the crosshair slopes, the common crosshair midpoint, and the relative angle of rotation of the crosshairs about the common crosshair midpoint. We assume the crosshair slopes, the common crosshair midpoint, and the relative angles of rotation of the crosshairs about the common crosshair midpoint have been computed for the images taken at time1 and time2. Any algorithm performing the required steps is considered within the scope of this invention.

A displacement of the common crosshair midpoint will be produced by a force applied normal to the sensor (and, as noted, the midpoint will move in the direction opposite the direction of the force). The displacement d separating the common crosshair midpoints of the two images is readily determined from knowledge of the pixels locations corresponding to the midpoints. The amount of physical movement can be determined from knowledge of physical cell geometry on the imaging device. The displacement thus determined, and knowledge of the sensor geometry, is sufficient information to compute the incremental change in bend radius R using calculations similar to those in Equation 2.

All illuminated points in the measurement space move the same distance and in the same direction in a pure translational displacement. A torqueing force couple, if equal at time1 and time2, would produce equal rotations. Because an assumed bending force produces a translation, equal torqueing force couples would result in equal angular rotations, but about a different center. The consequence is that the crosshairs of two equal torqueing force couples in the time1 and time2 images would be parallel to one another if the two images were superimposed. The difference in the relative angle of crosshair rotation is a result of the incremental change in torque applied between time1 and time2; the amount of the incremental change is readily computed using knowledge of sensor geometry and shear modulus of rigidity using the relationship given in Equation 4.

As noted, a variety of algorithms are possible. Measurements taken without the application of force on the sensor system may be compared to the determined values at any point in time to find the instantaneous total angle of deflection and distance from the equilibrium center relative to the initial reading. Equation 1 above may be used to find the angular displacement. If the drill string is rotating while experiencing a bending force, the common crosshair midpoint will describe a circle in the image space. The radius of the common midpoint circle will be the displacement needed to determine angular displacement; allowing Equation 2 to be used to determine the bend radius. Equation 4 is used to determine the torqueing couple exerted on the pipe section from a measure rotation. The processor determines these values and transmits them to a user display. The display may provide the operator with an indication of how close he or she is to exceeding the bend or torque limitations of the pipe section.

The present invention is also directed to a method for determining bend radius and torque forces exerted on a pipe section during drilling operations. The method includes transmitting the light beam 37 from a light source 30 disposed within a first end of the pipe section and detecting the tight beam with a photoarray 32 or other optical sensing device supported within the second end of the pipe section. The photoarray 32 generates a detection signal indicative of the position of the light beam on the optical sensing device and transmits the detection signal to a processor 34. The processor 34 uses the detection signal to determine the torque or bend radius of the pipe section. The torque and bend radius may then be displayed on a display device at the tracker receiver 22 or the drive machine 12.

In accordance with the present invention the light source 30 may comprise an LED or laser emitting device and the optical sensing device may comprise a photoarray such as a CMOS imaging array typical of those used in digital cameras and small cellular telephones. In an embodiment of the present invention the light beam emitted from the LED 30 is transmitted through an optical mask 44 comprising at least one orifice 46 before it impinges the photoarray or other optical sensing device 32.

The method of the present invention may further include detecting the cross-hair pattern emitted from a laser light source 30a. In such a method generating the detection signal indicative of the position of the light beam 37 on the optical sensing device 32 comprises following movement of the cross-hair laser beam across the surface of the optical sensing device.

An alternative method may also be used to determine the bend radius and torque forces exerted on a pipe section during drilling operations using the pixels in the image data. This method is disclosed in M. F. Guard, "Optical Measurement of Angular Deformation and Torque Inside a Working Drilstring," IEEE Trans. Instrum. Meas., vol. 65, no. 8, pp. 1895-1901, August 2016, and incorporated herein by reference. The number of active pixels in the image gathered by the photoarray 32 depends on the mode of operation and software interface used. Using a software interface with the MCU 34 may provide access to all available pixels whereas the MCU 34 may only give access to a certain amount of available pixels in certain modes. The below table, for example, shows what the available pixels may be in certain modes.

| Operating mode | Active Imager size | Active diagonal | Active pixels |
| --- | --- | --- | --- |
| Entire sensor | 6.440 mm(H) by 4.616 mm(V) | 7.923 mm | 3856(H) by 2764(V) |
| Still mode | 6.119 mm(H) by 4.589 mm(V) | 7.649 mm | 3664(H) by 2748(V) |
| Video mode | 6.413 mm(H) by 3.607 mm(V) | 7.358 mm | 3840(H) by 2160(V) |
| Software Interface mode | 6.413 mm(H) by 4.589 mm(V) | 7.886 mm | 3840(H) by 2748(V) |

As shown in the above table, the software interface mode has an accessible image or pixel space of 3,840 (H)×2,748 (V)=10,552,320 pixels. Each pixel may be, for example, 1.67 μm by 1.67 μm. The software may perform an 8-bit grayscale conversion of the entire image captured, resulting in an X-Y coordinate system in which each pixel's content is an 8-bit (0-255) grayscale number representing the light amplitude impinging that pixel. Pixels are typically numbered from (0,0) at the lower left-hand corner of the image to, in the present example, (3839, 2747) at the upper right-hand corner of the image.

To measure the rotation or torque, the starting position of the central (x,y) coordinates of the pinholes 48 in the optical mask 44 should first be determined. Instead of initiating a search through the image's entire pixel space, the central coordinates of pinholes 48 may be determined using signal centroid calculations.

Figure 9:
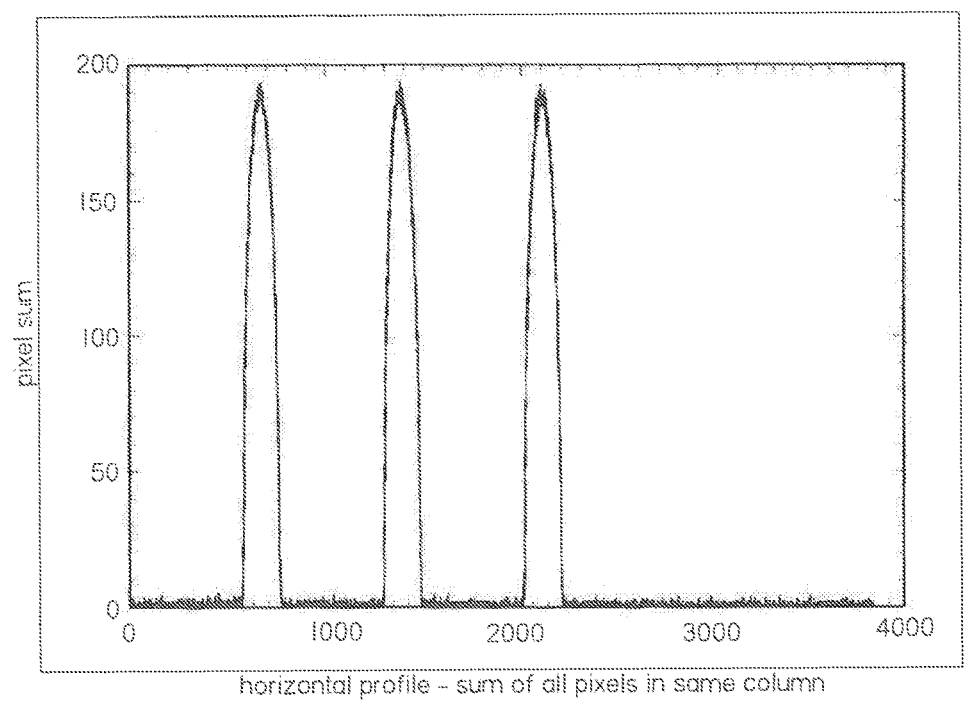
FIG. 9 shows a profile along the horizontal axis in image space of the pinholes formed in the optical mask of FIG. 6.
Figure 10:
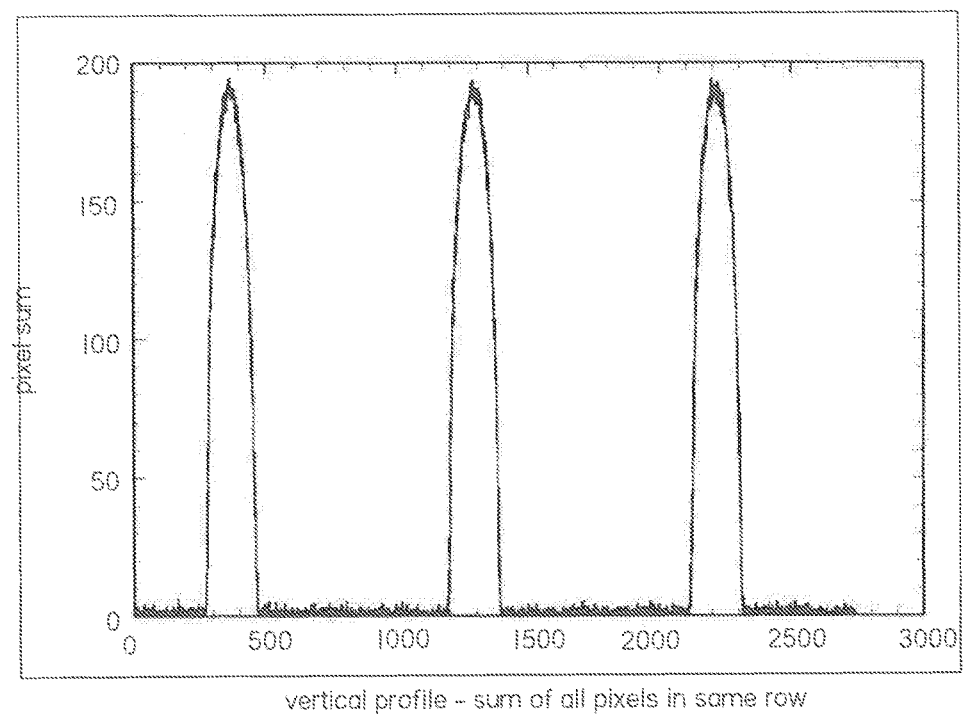
FIG. 10 shows a profile along the vertical axis in image space of the pinholes formed in the optical mask of FIG. 6.

The technique of using signal centroids begins by creating projections of the profiles of the pinholes 48 along the horizontal and vertical axes of the image captured by the photoarray 32. The software used with the MCU 34 may create X-axis and Y-axis signal density profiles by summing the contents of all pixels in each column to produce the X-axis profile, and in each row to produce the Y-axis profile. For example, FIGS. 9 and 10 show an example of a horizontal and vertical profile of the pinholes 48 from FIG. 6 in image space. The example resulting projections in FIGS. 9 and 10 evidence the location and symmetry of the pinholes 48 shown in FIG. 6.

The center of each of the pinholes 48 in FIG. 6 may be determined using the profile projections shown in FIGS. 9 and 10 by using any of several processing options. The preferred technique is to establish a threshold criterion; for example, determining which pixels exceed 10% of the maximum pixel response in the image. This thresholding operation yields three clusters of projection pixel coordinates for each axis for the pinholes 48 shown in FIG. 6. The averaged extreme locations of each cluster can be used as an approximate center for the signal centroid calculation. This allows a signal centroid calculation to be made about the approximate centers. A calculation window may be determined ahead of time based on the diameters of the pinholes 48 and the magnification of the lens used with the photoarray 32. Each signal centroid calculation, in both X-axis and Y-axis, provides the center of signal or signal centroids for each of the pinholes 48.

The signal centroids may be represented by $\bar{x}$ and $\bar{y}$. The signal projections along the horizontal and vertical axes of the image captured by the photoarray 32 may be denoted as $P_x(i)$ and $P_y(i)$ respectively, and are the distribution of pixel signal sums (signal density) formed along columns and rows, respectively.

Signal centroids for the entire image are given by:

$$\bar{x} = \frac{\sum_{i=1}^{3840} iP_x(i)}{\sum_{i=1}^{3840} P_x(i)} - 1$$

and $$\bar{y} = \frac{\sum_{i=1}^{2748} iP_y(i)}{\sum_{i=1}^{2748} P_y(i)} - 1$$

The sum limits are offset by exactly 1 from conventional image pixel indexing. This offset preserves centroid contribution from image pixel (0,0) even though this pixel generally does not contribute to the image. The subtraction of one unit in each calculation removes the offset, placing the resulting centroids in image space according to conventional indexing.

As shown in FIGS. 9 and 10, each of the three threshold signal profiles have non-zero pixel boundaries identified by software. For example, if an X-axis signal projection is clearly bounded by indices 600 and 800, the centroid calculation for that piece of the projection would be:

$$\bar{x} = \frac{\sum_{i=600}^{800} iP_x(i)}{\sum_{i=600}^{800} P_x(i)}$$

The signal centroid calculations provide coordinate pairs to represent the location of the center of the pinholes 48 in pixel space.

In operation, radial displacement of the pinholes 48 is used to calculate displacement and bend radius. To calculate torque, the angle or rotation of the pinholes 48 may be determined. The coordinates of the two outer pinholes 48 at rest, in FIG. 6 for example, are $(x_{1r}, y_{1r})$ and $(x_{2r}, y_{2r})$. The reference angle at rest is given by:

$$\theta_r = \tan^{-1}\left(\frac{y_{2r} - y_{1r}}{x_{2r} - x_{1r}}\right)$$

Figure 11:
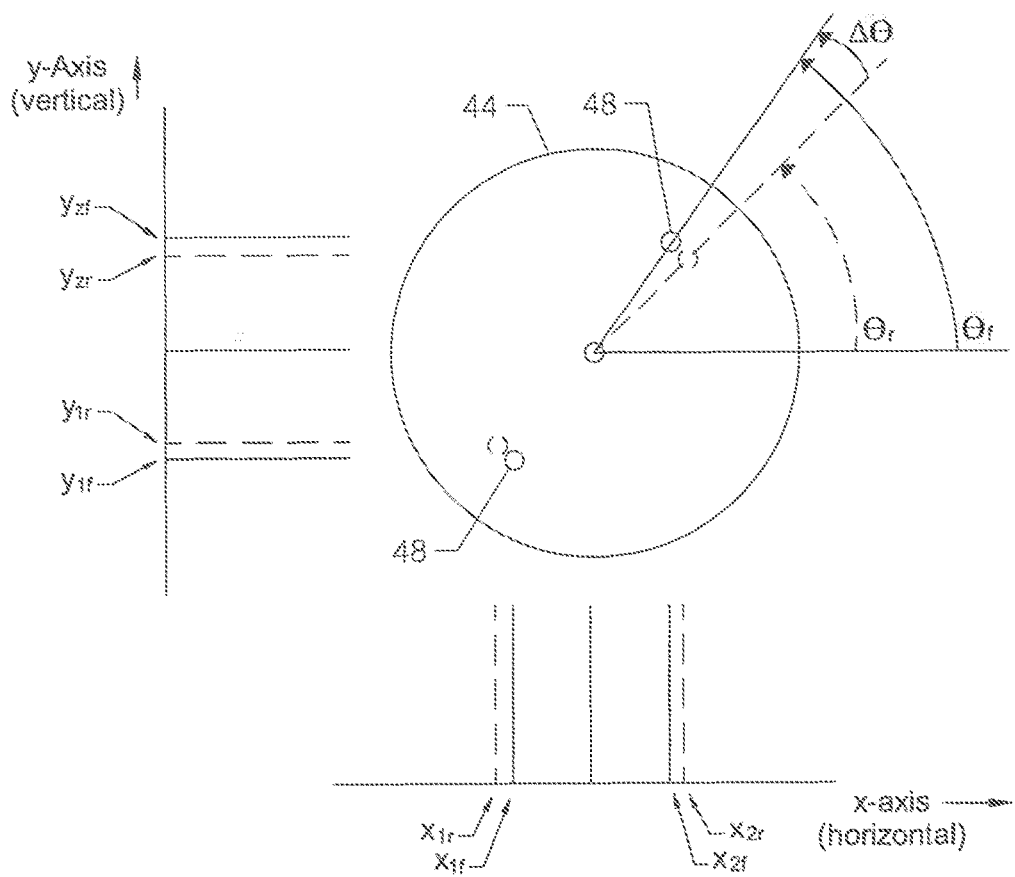
FIG. 11 shows an example of the rotational change in location of the pinholes of FIG. 6 after a force has been exerted on the sensor system of FIG. 2.

As torque is applied, the two outer pinholes 48 rotate slightly about the center pinhole 48. Changes in centroid location of the outer pinholes 48 can be used to determine the rotation angle. This is illustrated in FIG. 11 using a ten degree (10°) rotation, where the two outer pinholes 48 are shown as rotating in the counterclockwise direction (increasing the angle with respect to the X-axis) to locations having coordinates ($x_{1f}$, $y_{1f}$) and ($x_{2f}$, $y_{2f}$). The centroid locations of the pinholes 48 at rest are shown as dotted tines in FIG. 11. In the X- and Y-axis projections, separation between the two outer X-axis centers decreases, whereas separation between the two outer Y-axis centers increases. The final angle of the pinholes 48 with respect to the image's X-axis is given by:

$$\theta_f = \tan^{-1}\left(\frac{y_{2f} - y_{1f}}{x_{2f} - x_{1f}}\right)$$

Torque T produces angular deflection $\Delta\Theta = \Theta_f - \Theta_r$. Angular deflection is related to applied torque by the relationship:

$$\Delta\theta = \frac{(583.6)(T)(l)}{G(D_o^4 - D_i^4)}$$

where rotation angle $\Delta\Theta$ is given in degrees, torque T is given in inch-pounds, l is the length of the section in inches, $D_o$ and $D_i$ are the outer and inner diameters of the cylindrical section in inches, and G is the shear modulus of rigidity in psi (pounds/in$^2$). After rearrangement, torque equals:

$$T = \frac{(G)(D_o^4 - D_i^4)}{(583.6)(l)}(\Delta\theta)$$

G is a property of the housing 36 material, presumed constant over the displacement range of interest, and $D_o$, $D_i$, and l are constants determined by housing geometry. Thus, the relationship between torque and angular displacement may be linear over the small range of rotations permitted by the mechanical design.

In operation, the system may be calibrated by calculating the centroid of the entire image space at rest, on an occasional basis. If the entire image centroid and the centroid of the center pinhole 48 do not substantially match, or if the match degrades over time, there may be particulate contamination in the optical chain or mechanical damage to the system.

The torque or rotational measurement is ratiometric—it does not depend on an absolute measurement other than an initial full-scale calibration to account for part-to-part manufacturing variations in the housing's shear modulus of rigidity, G. The angle measurement at rest, $\Theta_r$, is determined using a ratio of differences between two centroids determined for the pinholes 48 in image space. The effects of static position errors in the image, such as those arising from mechanical misalignments, are largely eliminated by using a ratio of the simple differences. Likewise, the angle under torque, $\Theta_f$, and therefore the change in angle, $\Delta\Theta$, is determined by a similar ratio of image centroid differences made using the same target object in the same image space. These centroid separation measurements are made on a rectangular array of tiny uniformly-sized pixels. The source of the image objects is a precision set of small precision optical apertures maintained in uniform geometrical relationship with the lens and the photoarray 32 by mechanical means. The angular changes are small, and external perturbation (e.g., as produced by a change in temperature) is expected to have equal effect on all features involved in the image chain, allowing the ratios involved in angle calculations to remain substantially immune to significant external effects.

Figure 12:
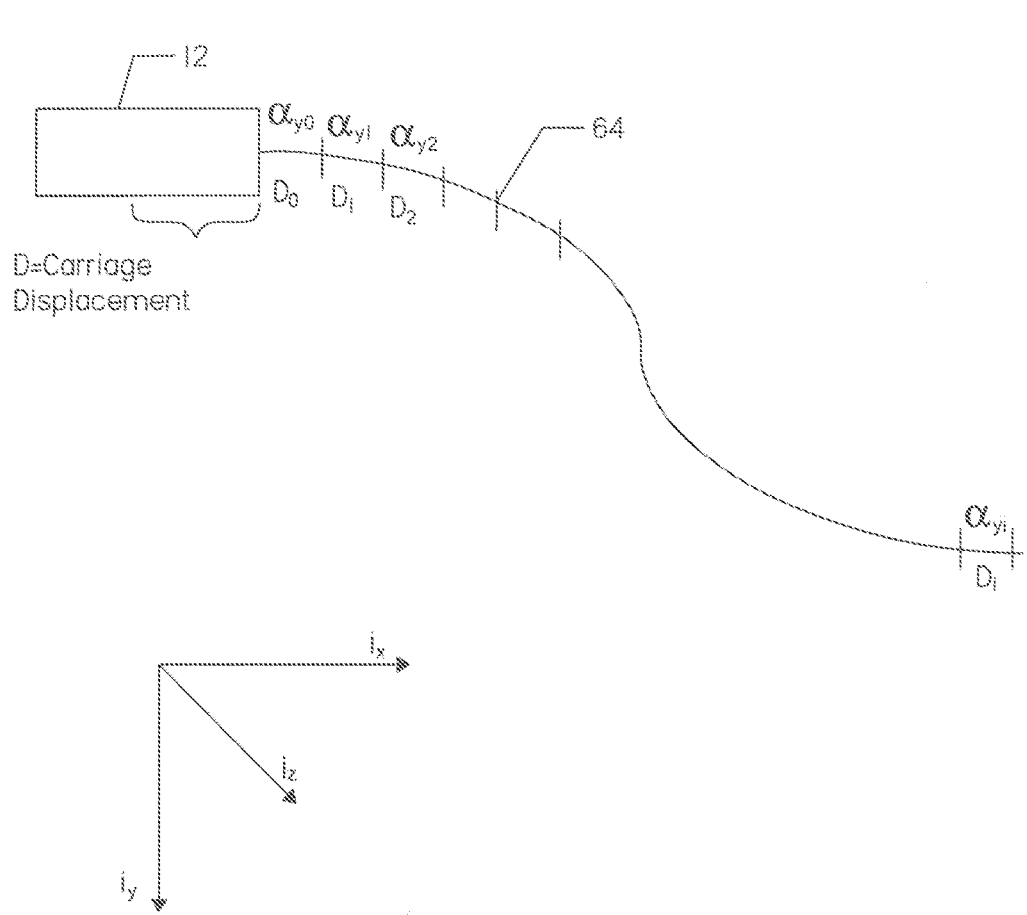
FIG. 12 is a diagrammatic representation of the drilling geometry conventions used to obtain navigation and position information from the sensor system of the present invention.

Turning now to FIG. 12, the sensor system 28 of the present invention may be useful in navigating the downhole tool assembly 16 through the ground. Navigation of the downhole tool assembly 16 may be accomplished using data comprising bend angle, pitch and roll position of the downhole tool 16, and the drill string's linear displacement. Bend angle data may be obtained from the sensor system 28 of the present invention. Pitch and roll data may be obtained from one or more accelerometers (not shown) carried by the beacon 24. The drill path is determined by the continual sum of individual incremental measurements over the length of the bore.

Referring still to FIG. 12, a plan view of a drive machine 12 and bore path 64 are shown therein. Three mutually orthogonal direction vectors define a Cartesian measurement space given with respect to machine orientation. The positive x-axis direction, represented by unit vector $\vec{i}_x$, is horizontal and directly forward when viewed from the rear of the drilling machine. The positive y-axis direction, $\vec{i}_y$, is horizontal and to the right when viewed from the rear of the drive machine 12. The positive z-axis direction, $\vec{i}_z$, is vertical and down when viewed from the rear of the drive machine 12. The Cartesian measurement space thus defined has a conventional right-hand orientation. Further assume each piece of drill pipe has incremental length $D_n$. Bend angle data from the sensor system 28 of the present invention may be resolved into horizontal and vertical bend angle components ($\alpha_y$ and $\alpha_z$, respectively) using information from one or more accelerometers (not shown) carried by the beacon 24 (FIG. 1). For example, deviation of the bore path 64 from the initial trajectory (relative to the initial direction vector of the drill string and the initial pitch of the drill string at entry) in plane view (viewed from above, or in the horizontal plane) may be determined in the x-y plane by the following equation:

$$f(x,y) = \sum_{n=0}^{i}[D_n \cos(\alpha_{yn})\cos(\phi_n)\vec{i}_x + D_n \sin(\alpha_{yn})\cos(\phi_n)\vec{i}_y] \quad \text{[Equation 5]}$$

where D represents drill string length, $\alpha_y$ represents the horizontal component of bend angle in the $i_y$ direction, $\alpha_z$ represents the vertical component of bend angle in the $i_z$ direction, and φ represents the pitch angle.

In operation, the operator may have a predetermined limit of acceptable torsional or bending forces that may be applied to the drill string. If the sensor system 28 or 28a signifies that the torsional force exerted on the drill string exceeds the predetermined limits, the operator or may decrease the torque applied to the drill string. Similarly, if the sensor system 28 or 28a signifies that the bend radius of the drill string has decreased below a predetermined limit, the operator may take action to increase the bend radius of the drill string. The processor may also be configured to automatically decrease the torque applied to the drill string or increase the bend radius of the drill string after such actions are determined necessary by the sensor assembly 28 or 28a.

Various modifications can be made in the design and operation of the present invention without departing from its spirit. Thus, while the principle preferred construction and modes of operation of the invention have been explained in what is now considered to represent its best embodiments, it should be understood that within the scope of the appended claims, the invention may be practiced otherwise than as specifically illustrated and described.

What is claimed is:

1. A system comprising:
   a pipe section comprising:
   an optical sensing device supported within the pipe section;
   a light source supported within the pipe section and spaced apart from the optical sensing device; and
   an optical mask disposed between the light source and the optical sensing device within the pipe section to allow a predetermined amount of light to pass through the optical mask and onto the optical sensing device; and
   a processor to determine a force exerted on the pipe section based on a position of the predetermined amount of light on the optical sensing device.

2. The system of claim 1 wherein the force exerted on the pipe section produces a torque or bend radius change.

3. The system of claim 1 wherein the light source comprises a light emitting diode.

4. The system of claim 1 wherein at least one orifice is formed in the optical mask.

5. The system of claim 1 wherein the optical mask comprises a plurality of holes equally and collinearly spaced across a centerline of the optical mask.

6. The system of claim 5 wherein one of the plurality of holes is positioned at a center of the optical mask and at least two holes are laterally displaced an equal distance from the center of the optical mask along a horizontal diameter.

7. The system of claim 6 wherein the hole at the center has a larger cross-sectional dimension than the remaining holes on the optical mask.

8. The system of claim 1 wherein the force exerted on the pipe section causes the light cast on the optical sensing device to move from a first position to a second position.

9. The system of claim 1 wherein the pipe section comprises a pipe section of a horizontal directional drill string.

10. The system of claim 9 wherein the processor will cause torque on the drill string to be reduced if the pipe section experiences a torque exceeding a predetermined limit.

11. The method of claim 9 wherein the processor will cause a bend radius of the drill string to increase if the bend radius of the pipe section decreases below a predetermined limit.

12. The system of claim 1 wherein the optical sensing device comprises a two-dimensional imaging array.

13. A directional drilling system comprising:
   a drive machine;
   a drill string comprising a first end, a second end, and the system of claim 1, wherein the first end is operatively connected to the drive machine; and
   a downhole tool assembly connected to the second end of the drill string for movement therewith.

14. A method for observing forces applied to a drill string comprising:
   providing a pipe section in the drill string comprising an optical sensing device, a light source, and an optical mask disposed between the optical sensing device and the light source within the pipe section;
   transmitting the light from the light source through the optical mask and onto the optical sensing device;
   detecting light allowed to pass through the optical mask with the optical sensing device; and
   determining a force exerted on the drill string based on a position of the light detected on the optical sensing device.

15. The method of claim 14 wherein the optical mask comprises a plurality of holes equally and collinearly spaced across a centerline of the optical mask.

16. The method of claim 14 wherein the force is a torsional or bending force exerted on the drill string.

17. The method of claim 14 further comprising reducing torque applied to the drill string if the pipe section experiences torque exceeding a predetermined limit.

18. The method of claim 14 further comprising increasing a bend radius of the drill string if the bend radius of the pipe section decreases below a predetermined limit.

19. The method of claim 14 wherein movement of the light detected by the optical mask is analyzed by a processor to determine the force exerted on the pipe section.

20. The method of claim 14 further comprising using the optical sensing device to capture a first image of light cast through the optical mask onto the optical sensing device when the force has not been exerted on the pipe section and capturing a second image of the optical mask after the force has been exerted on the pipe section.

* * * * *

UNITED STATES PATENT AND TRADEMARK OFFICE
CERTIFICATE OF CORRECTION

PATENT NO. : 10,060,807 B2
APPLICATION NO. : 15/215241
DATED : August 28, 2018
INVENTOR(S) : Blessum et al.

It is certified that error appears in the above-identified patent and that said Letters Patent is hereby corrected as shown below:

In the Specification

Column 1, Line 62, please delete "tight" and substitute therefor "light".

Column 2, Line 38, please delete ""trenchiess"" and substitute therefor ""trenchless"".

Column 3, Line 7, please delete "toot" and substitute therefor "tool".

Column 3, Line 11, please delete first occurrence of "toot" and substitute therefor "tool".

Column 3, Line 11, please delete second occurrence of "toot" and substitute therefor "tool".

Column 3, Line 27, please delete "White" and substitute therefor "While".

Column 4, Line 19, please delete "tight" and substitute therefor "light".

Column 5, Line 25, please delete "tight" and substitute therefor "light".

Column 5, Line 57, please delete "$\ominus = 583.6T/G(Do4 - Di4)$" and substitute therefor "$\ominus = 583.6TI/G(Do4 - Di4)$".

Column 8, Line 46, please delete "tight" and substitute therefor "light".

Column 9, Line 9, please delete "Drilistring" and substitute therefor "Drillstring".

Column 11, Line 9, please delete "tines" and substitute therefor "lines".

Signed and Sealed this
Ninth Day of October, 2018

Andrei Iancu
*Director of the United States Patent and Trademark Office*

CERTIFICATE OF CORRECTION (continued)
U.S. Pat. No. 10,060,807 B2

Column 12, Line 43, please delete "$f(x,y) = \Sigma_{n=0}^{i}[D_n \cos(a_{yn}) \cos(\phi_n)\vec{i}_x + D_n \sin(a_{yn}) \cos(\phi_n)\vec{i}_y]$" and substitute therefor "$f(x,y) = \sum_{n=0}^{i}[D_n \cos(\alpha_{yn}) \cos(\phi_n)\vec{i}_x + D_n \sin(\alpha_{yn}) \cos(\phi_n)\vec{i}_y]$".